US012315328B2

(12) United States Patent
Rae et al.

(10) Patent No.: US 12,315,328 B2
(45) Date of Patent: May 27, 2025

(54) ELECTRONIC GAMING MACHINE AND SYSTEM HAVING VISUAL PERSISTENCE ELEMENT AND ELIGIBILITY CRITERION WITH INCREASING HEIGHT SUBSTITUTED REELS AND MULTIPLIERS

(71) Applicant: Aristocrat Technologies Australia Pty Limited, North Ryde (AU)

(72) Inventors: Claudia Rae, Waitara (AU); Dinh Toan Tran, Wetherill Park (AU); Xin Liu, Denistone West (AU); Antoon Visser, Coogee (AU); Harender Singh, Plumpton (AU); Igor Suslik, Westleigh (AU)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 432 days.

(21) Appl. No.: 17/953,013

(22) Filed: Sep. 26, 2022

(65) Prior Publication Data

US 2023/0093837 A1 Mar. 30, 2023

(30) Foreign Application Priority Data

Sep. 30, 2021 (AU) ................................ 2021240258

(51) Int. Cl.

*G07F 17/34* (2006.01)
*G07F 17/32* (2006.01)

(52) U.S. Cl.

CPC ...... *G07F 17/3213* (2013.01); *G07F 17/3267* (2013.01)

(58) Field of Classification Search

CPC .......................... G07F 17/3213; G07F 17/3267
See application file for complete search history.

(56) References Cited

U.S. PATENT DOCUMENTS

2009/0221353 A1* 9/2009 Joung ................. G07F 17/3244 463/20
2009/0239637 A1* 9/2009 Rood ................. G07F 17/3244 463/20

* cited by examiner

*Primary Examiner* — Omkar A Deodhar
*Assistant Examiner* — Shauna-Kay Hall
(74) *Attorney, Agent, or Firm* — Greenberg Traurig, LLP

(57) ABSTRACT

An electronic gaming device comprises a display and a game controller. The game controller sets a count limit for each reel bearing special symbols, the special symbols being borne by up to m−1 reels of a first set of reels. For each base game round, the game controller selects a plurality of symbols. For each occurrence of the special symbol within the displayed symbols, for the reel on which the special symbol appears, control the display to display an increment of a counter up to the count limit for the reel, wherein the count persists for the base game rounds. For a feature game round, the game controller further performs a wild reel substitution for each reel where the reel count satisfies an eligibility criterion to provide a second set of reels. A visual indicator of increased opportunities to win may be displayed for each established extended wild reel eligibility.

20 Claims, 11 Drawing Sheets

300

| | Reel position | Reel 1 | Reel 2 | Reel 3 | Reel 4 | Reel 5 |
|---|---|---|---|---|---|---|
| | | 321 | 322 | 323 | 324 | 325 |
| 301 | 1 | Pic 1 | 10 | Pic 3 | Q | Pic 1 |
| 302 | 2 | Wild | Q | K | A | 10 |
| 303 | 3 | J | K | 10 | 10 | A |
| 304 | 4 | Q | A | Q | Pic 2 | Pic 2 |
| 305 | 5 | 10 | Pic 2 | K | J | A |
| 306 | 6 | A | 9 | Pic 1 | Wild | Q |
| 307 | 7 | Pic 2 | Wild | J | 9 | K |
| 308 | 8 | A | Pic 3 | K | 10 | Pic 2 |
| 309 | 9 | Q | Q | 9 | A | 9 |
| 310 | 10 | K | 10 | Q | Q | Wild |
| 311 | 11 | J | A | 10 | J | 9 |
| 312 | 12 | 10 | Wild | Wild | K | Q |
| 313 | 13 | Pic 3 | K | A | Wild | 10 |
| 314 | 14 | Wild | J | A | Pic 3 | Wild |
| 315 | 15 | 9 | 10 | Wild | Pic 1 | A |

331 343 342 341

*FIG. 3*

ELECTRONIC GAMING MACHINE AND SYSTEM HAVING VISUAL PERSISTENCE ELEMENT AND ELIGIBILITY CRITERION WITH INCREASING HEIGHT SUBSTITUTED REELS AND MULTIPLIERS

RELATED APPLICATION

The present application claims priority to Australian Patent Application No. AU 2021240258, filed Sep. 30, 2021, and entitled "Electronic Gaming Machine, Game Controller and Method," which is hereby incorporated by reference in its entirety.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In many games, a player may qualify for secondary games or bonus rounds by attaining a certain winning combination or triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player (RTP=return to player) over the course of many plays or instances of the game. The RTP and randomness of the RNG are critical to ensuring the fairness of the games and are therefore highly regulated. Upon initiation of play, the RNG randomly determines a game outcome and symbols are then selected which correspond to that outcome. Notably, some games may include an element of skill on the part of the player and are therefore not entirely random.

Gaming systems or devices may allow players to win awards. The awards may be determined based on predefined volatility criteria or return-to-player. Yet technical problems exist involving how a gaming device may satisfy a designated game return-to-player that either complies with applicable regulations for certain game features or is set to achieve a certain game volatility, where the gaming device involves expanding a quantity of symbol positions, employing wild symbols and multipliers, awarding multiple game rounds, influencing a likelihood of occurrence of special symbols, featuring multiple game windows and/or changing reel sizes or multipliers based on random outcomes, and increasing the numbers of ways to win based on bet sizes. For example, expanding a base game matrix having a number of display positions while adjusting a likelihood of occurrence of special symbols to a feature game having an additional number of display positions may present a number of technical challenges. One such technical challenge may include increasing the odds of awarding a payout more than a designated RTP or less than a targeted volatility intended. To meet or satisfy a target volatility criterion or designated RTP, the random nature of a game determination may, in a such multi-round game configuration with changing reel-size and multipliers, in turn and for example, drive a game device to over process and generate numerous game outcomes in the background before determining and displaying a game outcome to a player that satisfies the target volatility criterion or designated RTP for the designated jurisdiction.

Repeated determination of whether each of the numerous game outcomes yields the designated volatility each time the game is played may be an inefficient, and time and resource consuming process. Additionally, the confined screen size of many gaming devices creates challenges as to how game changes and related information are effectively communicated to the viewer.

Further limitations and disadvantages of conventional and traditional approaches will become apparent to one of skill in the art, through comparison of such systems and devices with some aspects of the present disclosure as set forth in the remainder of the present application with reference to the drawings.

SUMMARY

Embodiments of the present invention provide a spinning reel game with a persistence element and potential reel height increase feature. An optional multiplier may also be included. Elements influencing the potential win in a feature game are based on the persistence element of the base game.

An aspect provides a game controller configured to, in response to input of a wager, execute n game rounds, wherein n=b+f game rounds, where b base game rounds are executed followed by f feature game rounds, using symbol data defining a set of a plurality of symbols for each of m reels wherein for up to m−1 reels, the plurality of symbols includes one or more special symbols, wherein for each base game round the game controller selects a plurality of symbols from the sets defining the m reels for display in a set of symbols positions as a game outcome and for each occurrence of the special symbol, for the reel on which the special symbol appears, increment a counter up to a count limit for the reel based on the wager, wherein the count persists for the base game rounds; and for each feature game round: perform a wild reel substitution for each reel where the reel count satisfies an eligibility criterion, and select a plurality of symbols for the non-wild substituted reels; and determine an award of credits based on winning combinations of symbols in the selected symbols.

Another aspect provides a method of gaming executed by a game controller using a random number generator, and symbol data defining a set of a plurality of symbols for each of m reels wherein for up to m−1 reels, the plurality of symbols includes one or more special symbols, the method comprising: in response to input of a wager, setting a count limit for each reel based on the wager; executing n game rounds, wherein n=b+f game rounds, where b base game rounds are executed followed by f feature game rounds, for each base game round: selecting, by the game controller, a plurality of symbols from the sets defining the m reels and displaying the selected symbols in a set of symbols positions as a game outcome; and incrementing a counter up to a count limit for each occurrence of the special symbol, for the reel on which the special symbol appears, wherein the count persists for the base game rounds; for each feature game round: performing a wild reel substitution for each reel where the reel count satisfies an eligibility criterion, and selecting a plurality of symbols for the non-wild substituted reels; and determine an award of credits based on winning combinations of symbols in the selected symbols.

Another aspect provides a gaming machine comprising: a display; a credit input mechanism operable to establish credits on the gaming machine, the credit input mechanism including at least one of a coin input chute, a bill collector, a card reader and a ticket reader; meters configured for monitoring credits established via the credit input mechanism and changes to the established credits due to play of the gaming machine, the meters including a credit meter to which credit input via the credit input mechanism is added and a win meter; a random number generator; a game play mechanism including a plurality of buttons configured for operation by a player to input a wager from the established credits and to initiate a play of a game; and a game controller comprising a processor and memory storing (i) instructions or game program code, and (ii) symbol data defining m reels, and wherein the game controller is operable to assign prize values to combinations of symbols as required during play of the game, the game controller executing the instructions or game program code stored in the memory and responsive to initiation of the play of the game with the game play mechanism to: execute n game rounds, wherein n=b+f game rounds, where b base game rounds are executed followed by f feature game rounds; in response to a wager placed to play the base game rounds, set a count limit for each reel bearing special symbols, the special symbols being borne by up to m−1 reels of a first set of reels; and for each base game round: select a plurality of symbols from a first set of reels using the random number generator, wherein at least one of the first set of reels includes one or more special symbols; control the display to display the selected symbols in a plurality of columns of display positions during play of a base game; for each occurrence of the special symbol within the displayed symbols, for the reel on which the special symbol appears, increment a counter up to the count limit for the reel, wherein the count persists for the base game rounds; evaluate the displayed symbols to determine any occurrence of winning symbol combinations and prize payable; and for each feature game round: perform a wild reel substitution for each reel where the reel count satisfies an eligibility criterion to provide a second set of reels; select a plurality of symbols from the second set of reels using the random number generator; control the display to display the selected symbols in a plurality of columns of display positions; evaluate the displayed symbols to determine any occurrence of winning symbol combinations and prize payable; make an award of credits to the win meter or the credit meter based on a total of prize values assigned to combinations of symbols.

BRIEF DESCRIPTION OF THE DRAWINGS

FIG. 3 illustrates an example reel strip layout.

DETAILED DESCRIPTION

Figure 1:
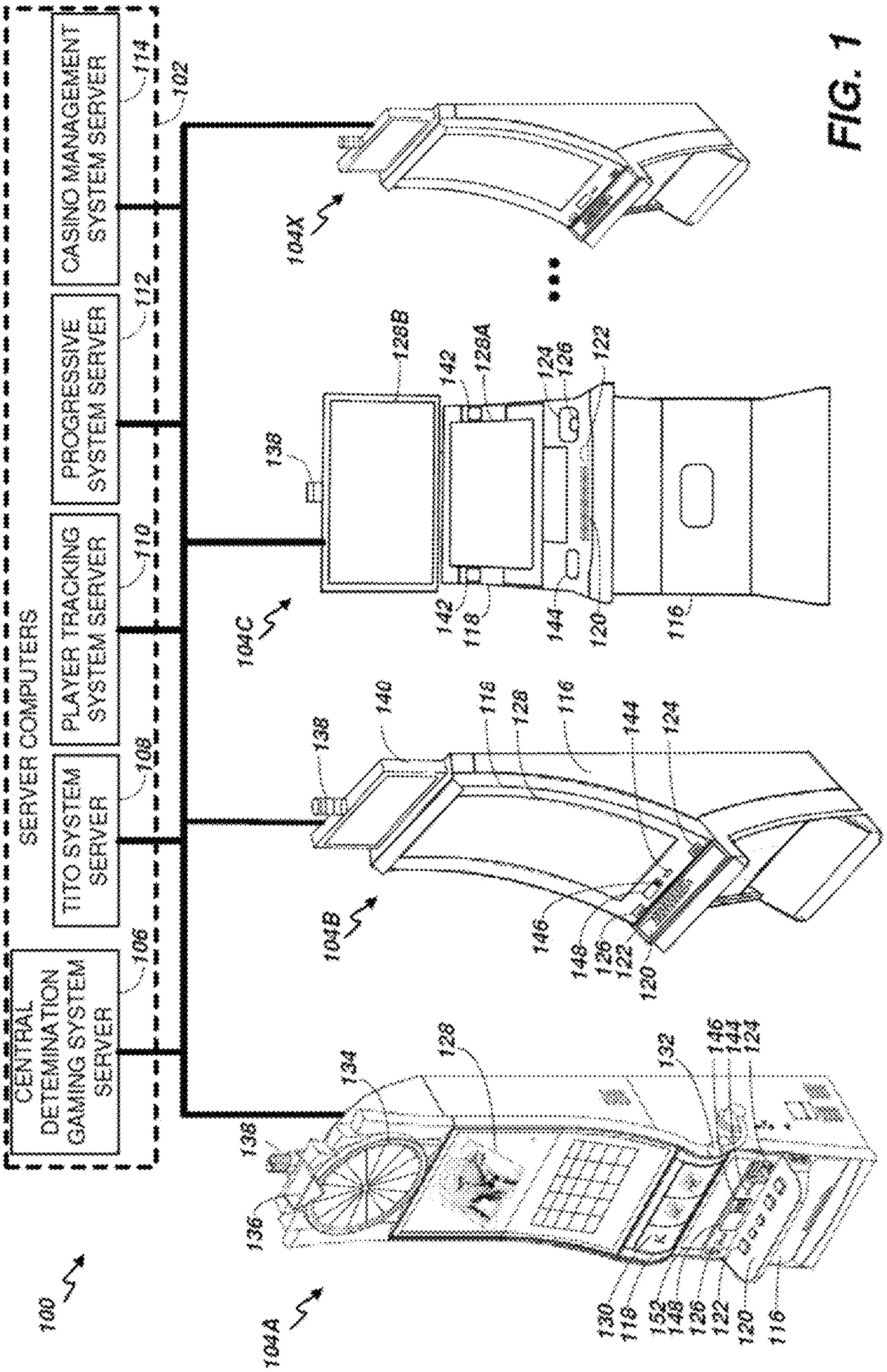
FIG. 1 is an exemplary diagram showing several EGMs networked with various gaming related servers.

When a number of special symbols have been accumulated or counted in one or more reels to one or more thresholds associated with the one or more reels during a series of base game rounds, a series of feature game rounds may be provided based on one or more player selections or wagers. The player selections may affect the thresholds, expansions of reels, likelihood of occurrence of special symbols in each of the reels, or multipliers available. The one or more reels may have same or different thresholds. Each of the counts may persist through the series of the base game rounds. The series of feature game rounds may include one or more of an expansion of some or all of the one or more reels, a substitution of symbols in the one or more reels with wild symbols, an animation of awardable piles in different states, and a visual increment of a number of ways available in a pay table to win, Implementations of the present disclosure represent a technical improvement in the art of gaming technology. Specifically, the implementations illustrated address the technical problem of controlling volatilities to meet one or more target thresholds that may include a designated or target RTP, a target game outcome, a target game payout, a target game volatility, a target win liability, a target maximum win liability, and the like, in an electronic gaming device with multi-game rounds, including base and feature game rounds, that employ a persistence element across the base game rounds, where the potential win outcomes are based on the persistence element of the base game and where the potential win outcomes may also be varied by increasing bet amounts, which permits increased ways of a winning outcome.

Implementations disclosed herein drive a game controller to generate game outcomes across multiple game rounds by controlling, among other things: the number of base and feature game rounds; the number of reels (e.g., reels 2 to 5) that may include special symbols that are persistent throughout the base games; and the number of occurrences of such persistent special symbols that need to be counted during the base game rounds, which are set to a count limit and that may be affected based on a wager amount. By way of example, in some implementations, a set number of game rounds are played (e.g., 10 rounds) where persistent special symbols are counted in the base rounds (e.g., 9 rounds). By employing the persistent special symbol count from a set number of base game rounds, one or more features in feature game rounds (i.e. round 10) can be triggered based on the persistent special symbol as an eligibility criterion and still meet a target return-to-player when using: a wild reel substitution, reel height increase to increase the win opportunity and/or multipliers. By employing such a configuration, the technique can control game volatility and/or maximum win liability for such a multi-game round, threshold-based, and reel expansion configuration while still maintaining RTP and enhancing player engagement.

Further, the incorporation of visual indicators, sometimes animated, visually transforms the displayed reels with special symbols that overlay one or more of the reels. The visual indicators provide an improved electronic game machine display in a confined game display size or space such that the player may better appreciate the persistent special symbols being displayed and the differently overlaid reels, may simplify otherwise complex game presentations for the player that avoids or reduces the need for understanding overly complicated calculations or repeated reference to game rules, and/or may improve player engagement during the game rounds. The graphical user interface employing the illustrated implementations can improve the usability of electronic gaming devices. For example, additional display positions with different optional thresholds associated with one or more of the reels may be animated on top of the one or more of the reels. In some cases, in addition to different optional thresholds and multipliers on top of the reels, an occurrence of special symbols may be counted toward the thresholds and counts of the special symbols may persist and also be displayed on top of the one or more of the reels. The presence of the thresholds and multipliers also control any animation of reel substitutions in one or more of the reels.

Thus, implementations of the present disclosure are not merely new game rules or simply new display patterns. Rather, the implementations provide technologic improvements to gaming technology in the art of electronic gaming devices and software for such electronic gaming devices, and enhanced interactions between players and gaming devices or machines.

Moreover, the above example is not intended to be limiting, but merely exemplary of technologic improvements provided by some implementations of the present disclosure. Technological improvements of other implementations are readily apparent to those of ordinary skill in the art in light of the present disclosure.

FIG. 1 illustrates several different models of EGMs which may be networked to various gaming related servers. The present invention can be configured to work as a system 100 in a gaming environment including one or more server computers 102 (e.g., slot servers of a casino) that are in communication, via a communications network, with one or more gaming devices 104A-104X (EGMs, slots, video poker, bingo machines, etc.). The gaming devices 104A-104X may alternatively be portable and/or remote gaming devices such as, but not limited to, a smart phone, a tablet, a laptop, or a game console.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, the present invention may, in one or more embodiments, be practiced on a stand-alone gaming device such as gaming device 104A, gaming device 104B or any of the other gaming devices 104C-104X. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 116 which provides access to the interior of the cabinet. Gaming device 104A typically includes a button area or button deck 120 accessible by a player that is configured with input switches or buttons 122, an access channel for a bill validator 124, and/or an access channel for a ticket printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game. In embodiments where the reels are mechanical, mechanisms can be employed to implement greater functionality. For example, the boundaries of the gaming display area boundaries of the gaming display area 118 may be defined by one or more mechanical shutters controllable by a processor. The mechanical shutters may be controlled to open and close, to correspondingly reveal and conceal more or fewer symbol positions from the mechanical reels 130. For example, a top boundary of the gaming display area 118 may be raised by moving a corresponding mechanical shutter upwards to reveal an additional row of symbol positions on stopped mechanical reels. Further, a transparent or translucent display panel may be overlaid on the gaming display area 118 and controlled to override or supplement what is displayed on one or more of the mechanical reel(s).

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. In some embodiments a ticket reader can be used which is only capable of reading tickets. In some embodiments, a different form of token can be used to store a cash value, such as a magnetic stripe card.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking server system 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
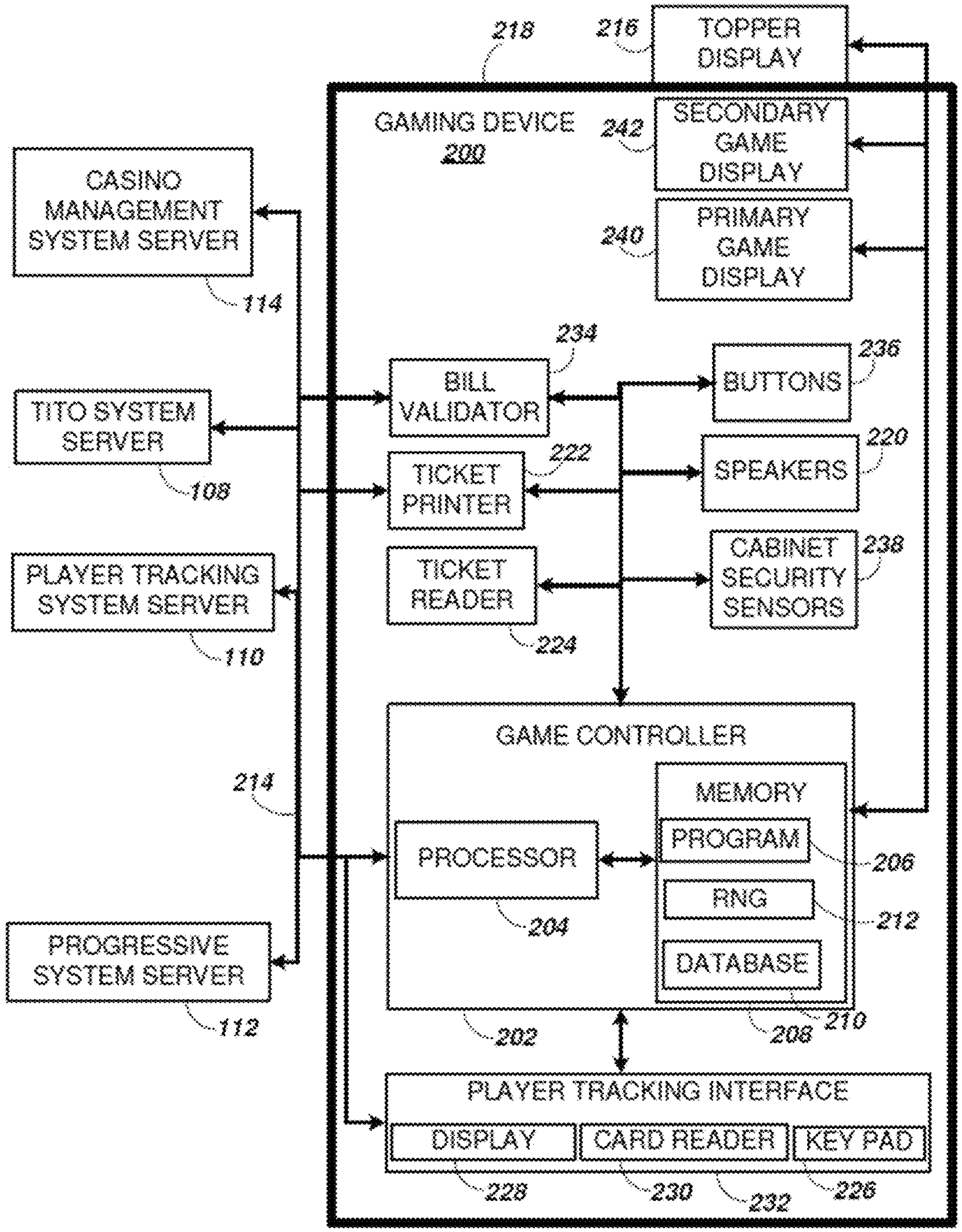
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present invention necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 118 which opens to provide access to the interior of the gaming device 104B. The main or service door 118 is typically used by service personnel to refill the ticket-out printer 126 and collect bills and tickets inserted into the bill validator 124. The door 118 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance. In some embodiments, the random number generator 212 is a pseudo-random number generator.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204.

The gaming device 200 may include a topper display 216 or another form of a top box (e.g., a topper wheel, a topper screen, etc.) which sits above main cabinet 218. The gaming cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on the game displays 240, 242. Other game and prize information may also be displayed.

When the player is done, he/she cashes out the credit balance (typically by pressing a cash out button to receive a ticket from the ticket printer 222). The ticket may be "cashed-in" for money or inserted into another machine to establish a credit balance for play.

FIG. 3 illustrates an example of a set 300 of five reel strips 321, 322, 323, 324, 325. In the example, each reel strip has fifteen reel strip positions 301-315. In other examples, each reel strip has more or less strip positions. Each reel strip position of each reel has a symbol. For example, a "WILD" symbol 331 occupies the sixth strip position of the fourth reel 324. Other reel strips to those illustrated in FIG. 3 can be used, for example, reel strips where two or more WILD symbols are placed at consecutive reel strip positions of a reel strip. In other examples, the reel strips could have between 30 and 100 reel strip positions. The actual lengths of the game reel strips depend on factors such as the number of wild symbols (in general, the more wilds there are, the longer the reel strip needs to be to maintain the target RTP), and volatility (in general, the higher the prize value is, the longer the reel strip needs to be to lower the hit rate to maintain the target RTP).

Figure 4:
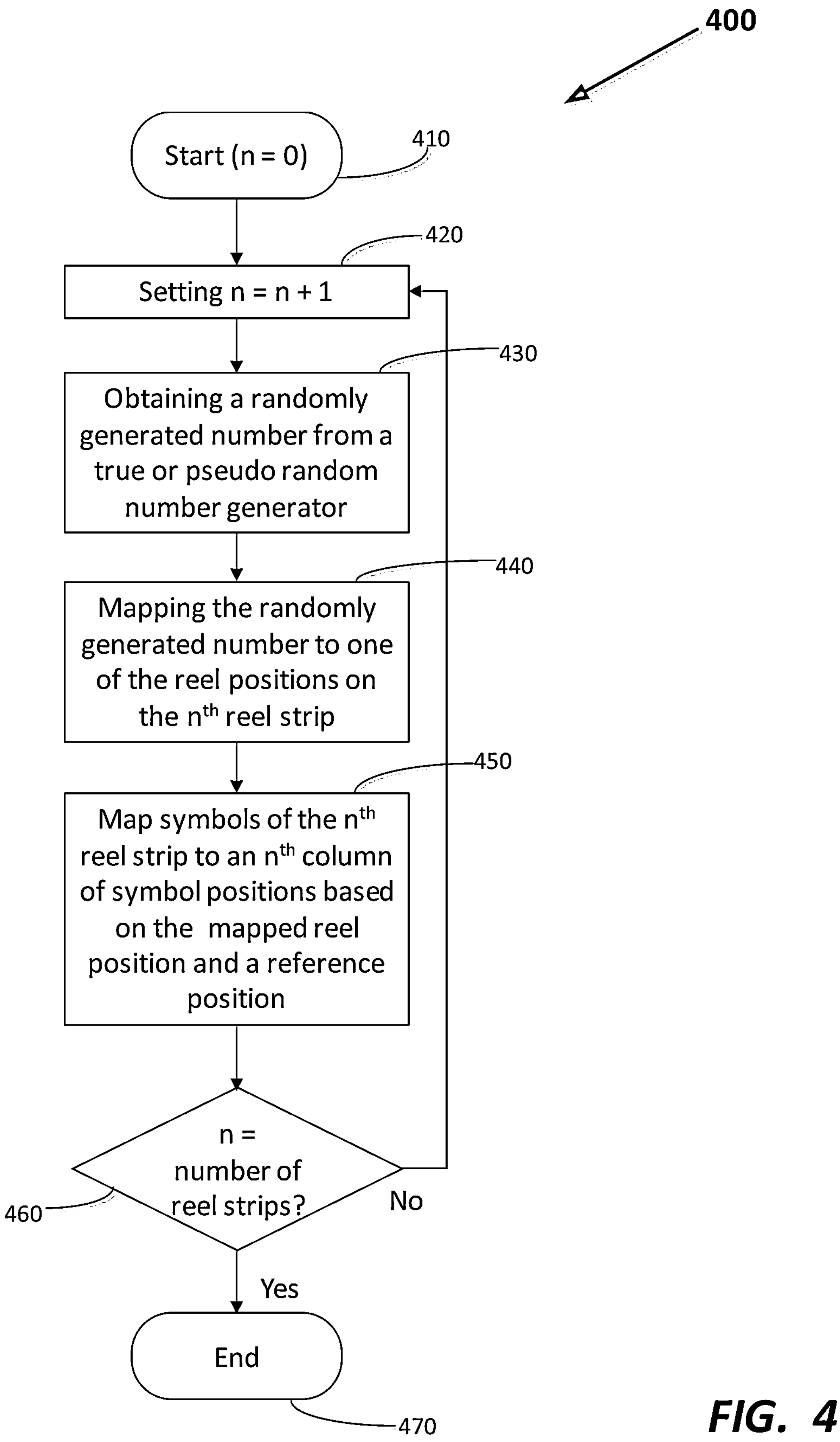
FIG. 4 is a flow chart of a symbol selection method.

FIG. 4 is a flow chart of a method 400 carried out by the processor 204 to select symbols from reel strips. At step 410, the processor 204 starts the process of selecting symbols with a counter (n) set at zero as symbols have not yet been selected from any reel strips. At step 420, the processor 204 increments the counter. In the first iteration, the counter is set to 1 to reflect that symbols are to be selected from a first reel strip. At step 430, the processor obtains a randomly generated number from a true or pseudo random number generator 212. At step 440 the processor maps the generated number to one of the reel positions of the nth reel strip. In the first iteration, this is the first reel strip. To map the generated number to one of the reel positions, the possible values that can be returned from the RNG 212 are divided into ranges and associated with specific ones of the reel positions in memory 208. In one example, these ranges are stored as a look-up table. In one example, the ranges are each the same size so that each of the reel strip positions has the same chance of been selected. In other examples, the ranges may be arranged to weight the relative chances of selecting specific reel strip positions. The reel strips may be of different lengths.

At step 450, the processor 204 maps symbols of the nth reel strip to and nth column of symbol display positions based on the mapped reel position and a reference position. In an example, the reference position is the bottom position of the symbol positions of each column of symbol positions. In this example, the selected reel position (and hence the symbol at this position) is mapped to the bottom symbol position of the column. In an example, there are two other symbol positions in the column of symbol positions and hence symbols at two neighboring reel strip positions are also mapped to the symbol positions of the column. Referring to the example reel strips of FIG. 3, if the value returned by the RNG 212 is mapped to reel position 313, then for the first reel strip 321, "Pic 3" symbol 343 is mapped to a bottom symbol position, "10" symbol 342 is mapped to a middle symbol position, and "J" symbol 341 is mapped to a top symbol position.

At step 460, the processor 460 determines whether symbols have been selected for all of the reel strips, and if not the processor 204 reverts to step 420 and iterates through steps 430, 440 and 450 until it is determined at step 460 that symbols have been selected from all n reel strips and mapped to all n columns of symbol positions after which the symbol selection process ends 470. Different numbers of symbols may be mapped to different numbers of symbol positions.

After the symbols of all reel strips have been mapped to symbol position, the processor 204 controls display 240 to display them at the symbol positions.

Embodiments of the present invention provide a spinning reel game with a persistence element and potential reel height increase feature. Elements influencing the potential win in a feature game are based on the persistence element of the base game. The game controller is configured to play at least one, preferably a plurality, of base game rounds, followed by at least one feature game round. During play of the base spinning reel game, some reels will include special symbols. Occurrences of the special symbols are counted during the base game play for each reel. Based on the count accumulated during the base game rounds, reels may be substituted for wild reels, this may also include an increase in reel height. In some embodiments, a multiplier may also be applied for one or more reels in the feature game. The eligibility for these wild reels and multiplier elements is based on the number of special symbols counted, and amount wagered. The amount wagered, or bet amount, is used to set limits on the maximum special symbol count for each reel. An example is illustrated in FIG. 5.

Figure 5:
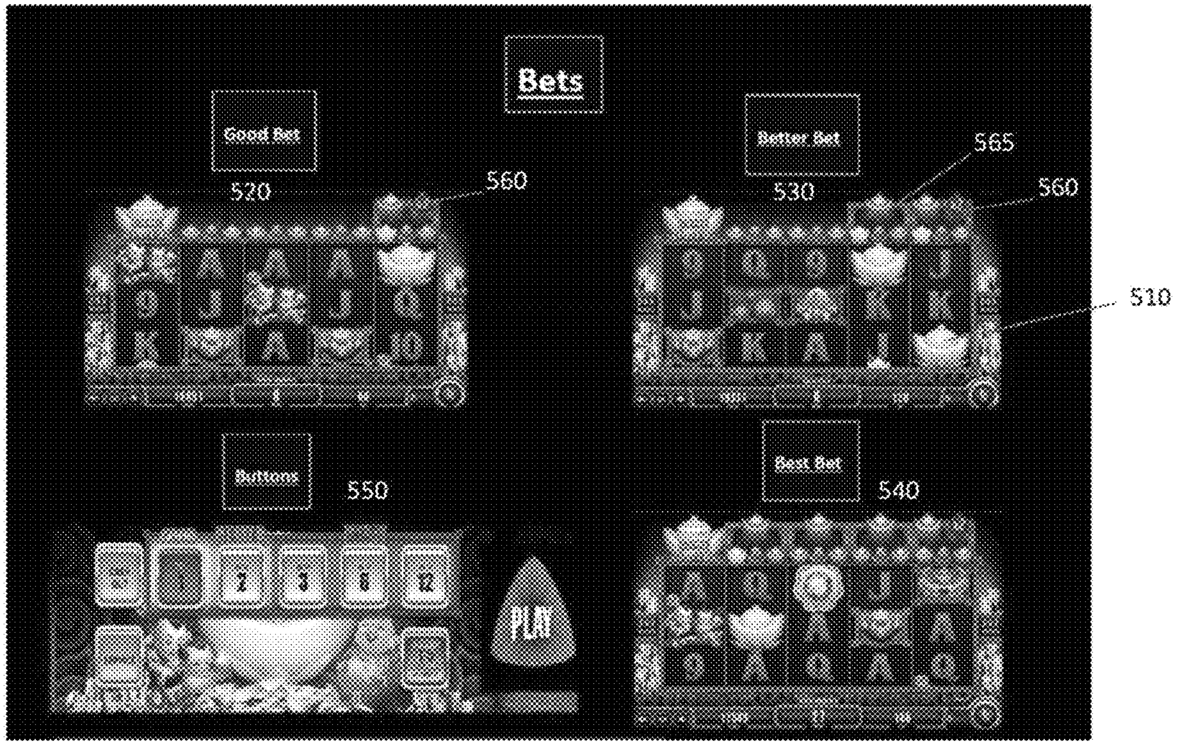
FIG. 5 illustrates an example bet options for an embodiment of an EMG.

FIG. 5 illustrates different bet options and associated eligible feature game element based on the bet. Based on the bet amount, count limits for each reel are set, which reflect the eligible feature elements. In the example of FIG. 5, the game is a spinning reel game having 5 reels with reels 2 to 5 including special symbols (in this example ingots) 510 occurrence of which are counted during the game rounds. FIG. 5 shows the feature game options available for each bet. This embodiment uses 3×5 Reel Power™ reel configuration enabling up to 243 ways to win in the base game. Feature game options include higher wild reels where a reel can be extended by an extra symbol position, increasing the ways to win in addition to the WILD symbol, the number of reels that may be extended is based on the wagered amount. This embodiment also enables a ×2 multiplier on reel 5.

As is shown in FIG. 5, a "Good Bet" 520 enables possible extension of reel 5 560, increasing the number of ways to win to 324, if this extension is awarded. A "Better Bet" 530 enables possible extension of reels 4 565 and 5 560, increasing the number of ways to win to 432, and "Best Bet" 540 enables possible extension to all of reels 2 to 5, increasing the number of ways to win to 768. Buttons 550, which may be virtual (touch screen buttons) or physical buttons may be displayed to enable a player to choose their bet level. Table 1 provides an example of set bets and ways to win.

TABLE 1

| Wager amount | Bet Category | Min ways | Max ways |
|---|---|---|---|
| 60 Credits | Good Bet | 243 | 324 |
| 120 Credits | Better Bet | 243 | 432 |
| 180 Credits | Best Bet | 243 | 768 |
| 360 Credits | Best Bet | 243 | 768 |
| 720 Credits | Best Bet | 243 | 768 |

Bet amounts may be set for each level. Alternatively, each of these categories of bet may be based on a threshold number of credits wagered. In an embodiment, increasing the bet amount (i.e. number of credits wagered per round) above the "Best Bet" threshold will not increase the number of reel extensions, but may alter the amount payable for winning combinations based on the wager amount. Increasing the amount bet for a "Best Bet" may also influence the number of special symbols included in the reels to increase the likelihood of occurrence of the feature game elements.

The game controller is configured to execute fixed number of game rounds, comprising base game rounds, followed by at least one feature game round. In the base game round, special symbols are accumulated which influence the reel configuration and optionally multipliers which are applied in the feature round. The eligibility criterion for wild or extended wild reels is based on the number of special symbols counted on each reel during the base game rounds, or is limited based on the amount bet. It should be appreciated that actions such as adjusting the reel configuration and adding a multiplier to a reel alters the probability for winning outcomes and therefore potential payouts in the feature game. Such features can increase the volatility in payouts while maintaining regulated return to player for the gaming machine.

In the following example, the game is played using a 3×5 reel configuration and the game comprises ten rounds, these being nine base game rounds followed by one feature game round. Special symbol count limits are set based on the wagered amount. For example, in the embodiment illustrated in FIGS. 6A-6C, for a "Good Bet" up to 2 special symbols may be counted on reels 2, 3 and 4, and up to 4 special symbols on reel 5. For a "Better Bet" up to 2 special symbols may be counted for reels 2 and 3, up to 3 special symbols for reel 4 and up to 4 special symbols for reel 5. For a "Best Bet" up to 3 special symbols may be counted for reels 2, 3, and 4 and up to 4 special symbols may be counted for reel 5. In this example, a count of 2 special symbols for a reel, is a criterion for the reel to be substituted for a wild reel. A count of 3 special symbols is a criterion for the reel to be substituted for a higher wild reel, increasing the reel height by one as well as substituting wild symbols. A count of 4 special symbols is a criterion for the higher wild reel substitution with a multiplier applied.

Figure 6A:
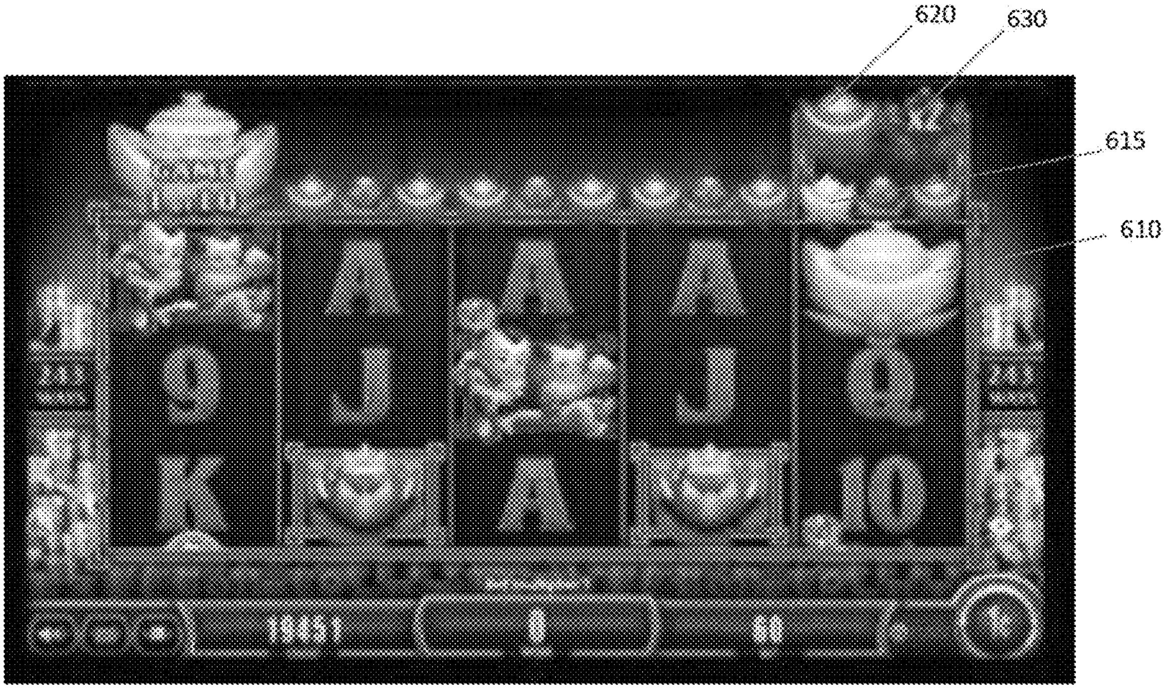
FIG. 6A to 6C illustrate examples of displayed game outcomes for different bet categories.
Figure 6B:
Figure 6C:

The count limits can be visually indicated on the displayed game outcome. For example, FIGS. 6A-C each shows a game outcome for round 1 of 10, for a different bet, with FIG. 6A being for Good Bet, FIG. 6B being for Better Bet, and 6C being for Best Bet. In this example, referring to FIG. 6A, and looking at reel 5, the special symbols are ingots 610, and the special symbol count is illustrated as little ingots 615 which change color (i.e. to gold) when the symbol count is incremented, two counted ingots will trigger a wild reel substitution. When three ingots are counted, the larger ingot 620 will be highlighted (i.e. change color from green to gold) to indicate that the higher wild reel substitution will take place in the feature round and the reel be extended from 3 to 4 positions. The fourth ingot counted will cause the multiplier symbol 630 to be highlighted, indicating the multiplier will be applied in the feature round. In FIG. 6A, only on reel 5 are the larger ingot and multiplier shown, and for reels 2 to 4 only two small ingots are shown, thus illustrating the count limits based on the bet type. FIG. 6B illustrates an example of a Better Bet game outcome, where for both reels 4 and 5 the larger ingot, indicating the possibility of the higher wild reel substitution. Reel 4 indicates a special symbol limit of 3, and reel 5 having the multiplier as well indicates a special symbol limit of 4. FIG. 6C is an example of a game outcome for a Best Bet, showing that all of reels 2 to 5 can potentially be extended to 4 positions, and the count limit of 3 for reels 2 to 4 and count limit of 4 for reel 5.

Figure 7:
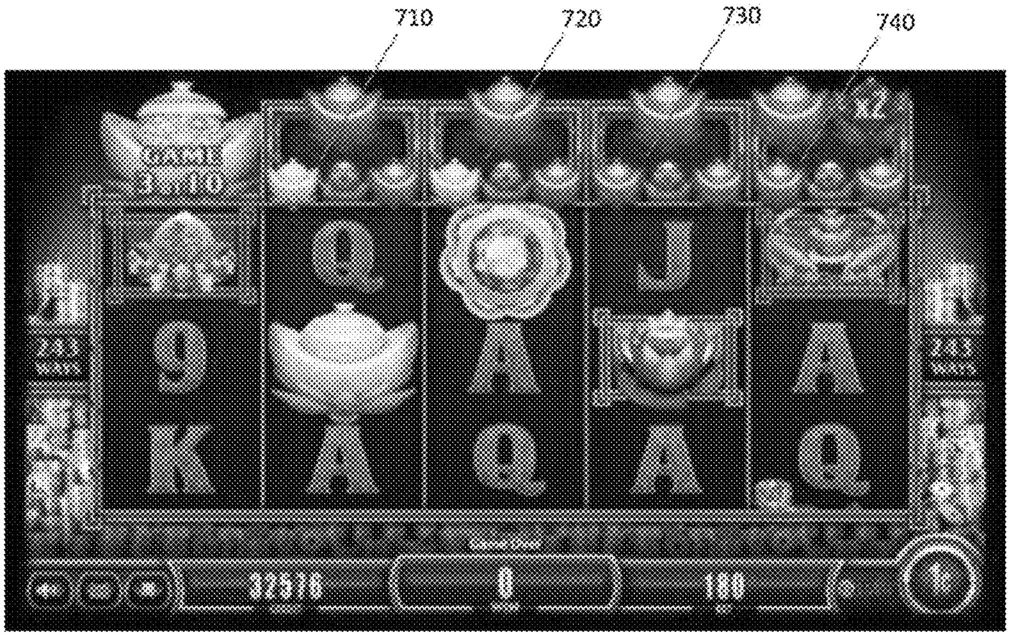
FIG. 7 illustrates an example of a game outcome for a base game round.
Figure 8:
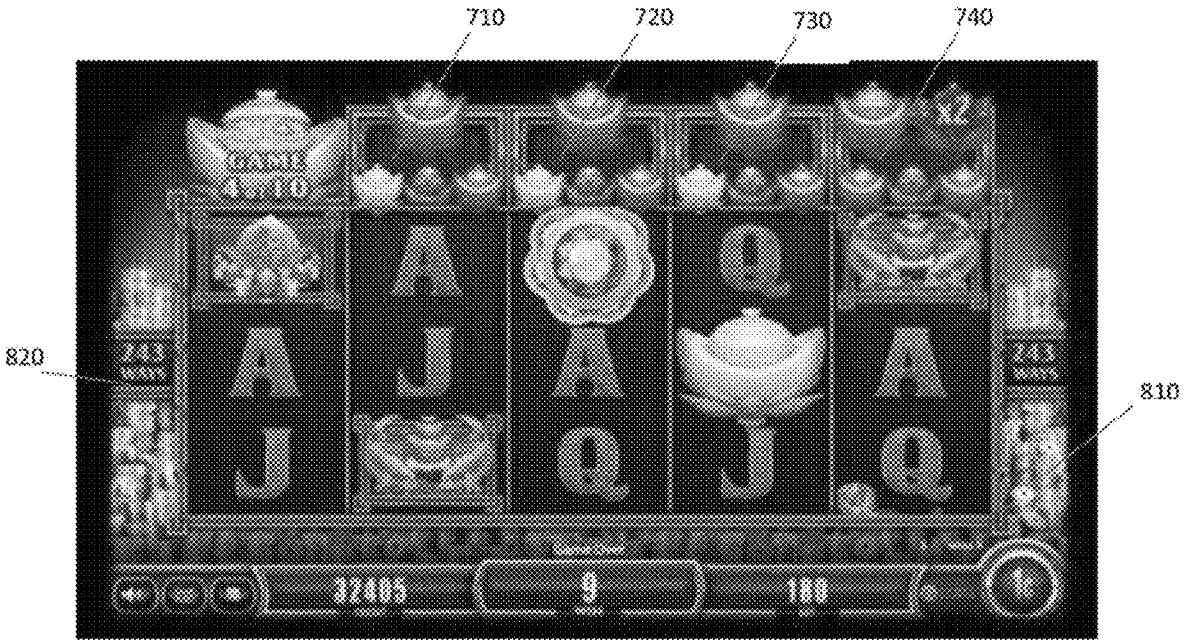
FIG. 8 illustrates an example of a game outcome for further base game round, showing persistence of special symbol count.

The game controller stores the special symbol count at the end of each base game round and the round number. For example, as shown in FIG. 7, a count of one is indicated for both reel 2 710 and reel 3 720 in game round 3, and these counts persist for game round 4 as shown in FIG. 8, where the count on reel 4 730 is incremented in response to the occurrence of a special symbol in the game outcome. The progress through the rounds can be indicated to the player for each base game round. For example, as shown in FIG. 8, the round indication (game 4 of 10) is provided above reel one. However, the round indication may be positioned or communicated in a different manner in other embodiments.

Figure 9:
FIG. 9 illustrates an example of a game outcome for a further base game round, showing persistence of special symbol count and highlighting of eligibility for feature game elements, including wild reel substitution and multiplier.

In some embodiments, as illustrated in the example of FIG. 9, reels may be highlighted when eligibility for wild substitution has been met, and this may indicate which wild substitution applies. For example, as shown in FIG. 9, reel 3 is highlighted to indicate the original 3 position reel is to be substituted for a wild reel, and for reels 4 and 5, the reels are highlighted including the additional $4^{th}$ position, indicating a higher wild substitution is to occur. The multiplier highlighted indicates this will also be applied in the feature game round. The feature game round is illustrated in FIG. 10, which shows reel 3 substituted for a 3-position wild reel, reels 4 and 5 substituted for 4-position wild reels, and a multiplier also applied for reel 5.

In some embodiments, information displayed with the game outcome can be arranged to visually communicate to the player increasing win potential for the feature game. For example, as shown in FIGS. 8-10, coin piles 810, 910, 1010 on each side of the main game outcome portion of the display (also referred to as the bevel) get bigger each time there is a wild reel highlight added. For example, when 2 ingots are collected on a reel on games 1-9, there is a highlight around that reel to indicate that reel will be a wild reel on the 10th game. Each time there is a new highlight, the coin pile on both sides of the reel window will grow. In this example, there may be 5 states: initial, 1, 2, 3, and 4 reel highlights—each state can be indicated by display of a different image of an increasingly large pile. The advantage of this feature is visually enhancing the game play experience and provide an instinctively interpretable indication to player of the increasing win potential accumulated through the base games. This helps tell the story that collecting something can build to something more.

Figure 10:
FIG. 10 illustrates an example of a game outcome for a feature game round.
Figure 11:
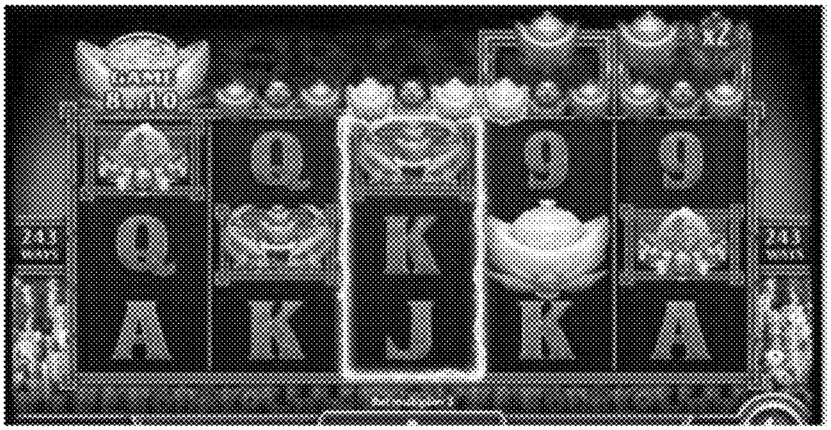
FIG. 11 illustrates an example of a game outcome for a base game round showing an initial visual indication of potential feature game wins, in the form of coin piles beside the reels.

Optionally, the number of ways available to win can also be communicated, as shown in FIGS. 8, 9 and 10, an indicator 820, 920, 1020 may be displayed beside the main game outcome portion of the display showing the reels, the label indicating the number of ways to win (paylines) that are applicable for the reel configuration in the feature game. As the player becomes eligible for higher wild reel substitutions in the game, the number of ways increases and the label 1020 is updated to display the number of ways.

It should be appreciated that these indicators of the increasing ways to win being a coin pile and a label are only one option for communicating this information and other variations may be used based on the game there. For example, a garden themed game may use a growing plant rather than a coin pile, other alternatives could be filling an aquarium or cocktail glass, many alternatives could be used within the scope of this feature.

In some embodiments, while the gaming machine is idle it may display one or more "attraction" displays to advertise the game to prospective players. In some embodiments, this can include information about the game play features described above. For example, this game has a persistence element. Different elements are stored at each bet. By visually displaying this information in the attract display, the player can see what the other bets look like so they are aware of where the different bets are (in terms of game number, how many ingots collected, cost, how many ways they can win up to). This makes it visually obvious, so the player is aware how/where each bet differs. This is even more helpful for the cabinets that have manual buttons, as the information about feature elements made available by each bet type can be demonstrated to players via the attract screen.

In an embodiment, bet buttons shown on a top screen inform the player what game number out of 10 that bet option is at as well as the cost to play, how many ways they could win up to and how many special symbols can be collected on each reel, and how many special symbols are the maximum that can be collected for each bet option. This display can also let the player know what they are currently playing.

Figure 12:
FIG. 12 illustrates an example of an attraction screen which may be displayed by an idle gaming machine.
Figure 13:
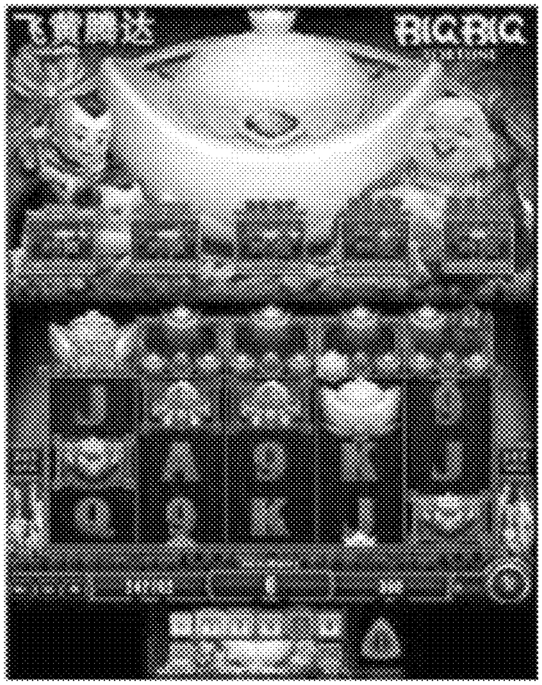
FIG. 13 illustrates an example of an attraction screen showing different bet options.
Figure 14:
FIG. 14 illustrates an example of an attraction screen highlighting a Better Bet option.
Figure 15:
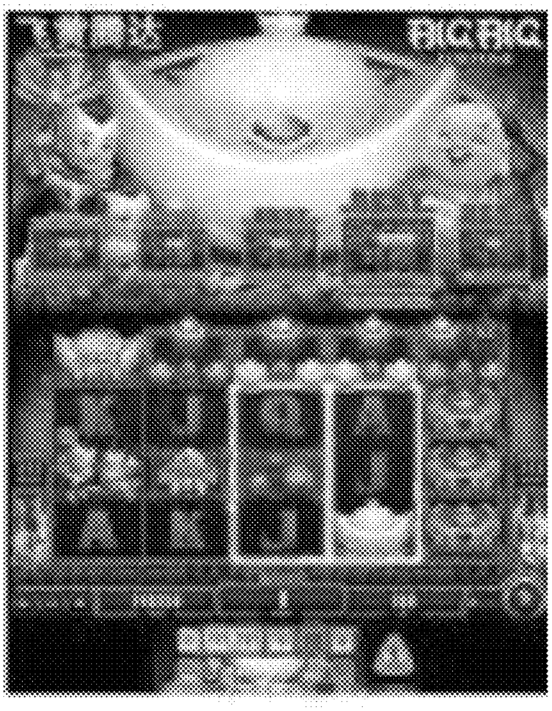
FIG. 15 illustrates an example of an example of an attraction screen highlighting a Best Bet option.

In an embodiment in the attract mode the gaming machine will display a sequence of screens to display the different bet options. In the accompanying example, FIG. 12 shows an example of an initial attract screen, FIG. 13 shows an example of a subsequent screen displaying the various bet options (good bet, better bet, best bet 1, best bet 2, best bet 3) from which the player can choose to play. FIG. 14 and FIG. 15 show examples of display screens highlighting different bet options, and accumulation of ingots. The player can place their bet by selecting a button for the desired bet. On selection of the desired bet button the player sets the amount they will wager, and the persistence feature options for the selected bet are applied.

Figure 16:
FIG. 16 illustrates an example of an example of a further feature game embodiment utilizing dual reel windows.

In an alternative embodiment, a dual window version of the game play is provided. This may be provided as an additional feature game, triggered from the initial set of games. In this embodiment 2 reel windows nest to each other. The feature game can involve a plurality of game rounds (for example 5 free games), in each game round, there are plurality of wild reels, which can be allocated randomly between reels 2 to 5 in the two reel windows. For example, at one extreme one set of reels may have 4 wild reels and the other 0, or the wild reels may be distributed evenly or unevenly between the two windows. In the example illustrated in FIG. 16, the baby symbol is the wild symbol, this example shows a reel layout of 2 3×4×4×4×4 windows, and in this example three wild reels have been allocated in the first window and one in the second window. This has advantages in enabling high volatility, while maintaining regulated RTP. For example, this enables some big wins and a variety of wins within the required RTP.

Figure 17:
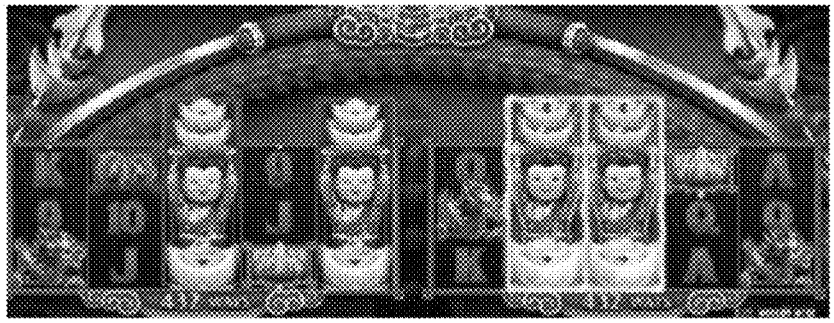
FIG. 17 illustrates an example of an example of a further feature game embodiment utilizing dual reel windows.

In an alternative embodiment, and example of which is shown in FIG. 17, the reel layouts in the two windows are 3×5 windows, and the wild reels are 4 positions high. Thus, depending on the number of wild reels appearing on each window the maximum number of ways to will can increase, and be different for each reel. Again, this has volatility advantages.

In the examples above the game is played using 5 reels, however this may be varied in different embodiments. Similarly, the number of game rounds may vary, and the proportion of base game and feature rounds may also vary. In the example above there are ten game rounds, with nine being base games and one being a feature game. This may be varied, for example eight game rounds with six being base game rounds and two being feature game rounds. As elements for the feature game are accumulated during base game play, typically the number of base game rounds will exceed that of feature games, but this may not be the case in all embodiments.

As discussed above the game controller configured to, in response to input of a wager, execute n game rounds, wherein n=b+f game rounds, where b base game rounds are executed followed by f feature game rounds, using symbol data defining a set of a plurality of symbols for each of m reels wherein for up to m−1 reels, the plurality of symbols includes one or more special symbols.

For each base game round the game controller selects a plurality of symbols from the sets defining the m reels for display in a set of symbols positions as a game outcome. For each occurrence of the special symbol, for the reel on which the special symbol appears, a counter is incremented up to a count limit for the reel based on the wager. This count persists for the base game rounds.

For each feature game round the game controller performs a wild reel substitution for each reel where the reel count satisfies an eligibility criterion. The game controller then selects a plurality of symbols for the non-wild substituted reels. Awards are determined based on winning combinations of symbols in the selected symbols.

During game rounds prize awards for winning combinations of symbols occurring in the game outcomes may be accumulated in a win meter before being transferred to the credit meter at the end of game play. In alternative embodiments, the accumulated award may bypass the win meter and be credited directly to the credit meter.

Embodiments of the present implementations are set forth in further detail below. In one implementation, a game controller is configured to, in response to input of a wager, execute n game rounds, wherein n=b+f game rounds, where b base game rounds are executed followed by f feature game rounds, using symbol data defining a set of a plurality of symbols for each of m reels wherein for up to m−1 reels. The plurality of symbols includes one or more special symbols, wherein for each base game round the game controller selects a plurality of symbols from the sets defining the m reels for display in a set of symbol positions as a game outcome. For each occurrence of the special symbol for the reel on which the special symbol appears, the game controller increments a counter up to a count limit for the reel based on the wager, wherein the count persists for the base game rounds. For each feature game round, the game controller performs a wild reel substitution for each reel where the reel count satisfies an eligibility criterion, and selects a plurality of symbols for the non-wild substituted reels. Further, the game controller determines an award of credits based on winning combinations of symbols in the selected symbols.

In other implementations, the game controller further comprises applying a multiplier where the reel count satisfies an eligibility criterion. The game controller may include a wild reel substitution where all symbol positions for the reel are occupied by one or more wild symbols, and an extended wild reel substitution where an additional display position is added for the reel and all symbol positions for the reel are occupied by one or more wild symbols. Count limits may be different for one or more reels. The eligibility criterion for wild reel substitution may be set for each reel.

In still other implementations, the game controller may set all of the m−1 reels including the special symbols. For example, when the number of reels (m) is 5, reels 2 to 5 may include the special symbols. In another example, n is a set number of games and the base game rounds is greater than the feature game rounds. An n set number of games may be fixed, e.g., where n=10. In one example, there are nine base game rounds (b=9) and one feature game round (f=1).

In another implementation, a visual indicator of increasing opportunities to win may be displayed for each extended wild reel eligibility established.

In a further example, a method of gaming is disclosed. The method executes by a game controller using a random number generator, and symbol data defining a set of a plurality of symbols for each of m reels wherein for up to m−1 reels, the plurality of symbols includes one or more special symbols. The method comprises in response to input of a wager, setting a count limit for each reel based on the wager; executing n game rounds, wherein n=b+f game rounds, where b base game rounds are executed followed by f feature game rounds. For each base game round, the game controller selects a plurality of symbols from the sets defining the m reels and displaying the selected symbols in a set of symbol positions as a game outcome; and increments a counter up to a count limit for each occurrence of the special symbol for the reel on which the special symbol appears, wherein the count persists for the base game rounds. For each feature game round, the game controller performs a wild reel substitution for each reel where the reel count satisfies an eligibility criterion; selects a plurality of symbols for the non-wild substituted reels; and determines an award of credits based on winning combinations of symbols in the selected symbols.

In another example, the method comprises applying a multiplier where the reel count satisfies an eligibility criterion. In various implementations, the wild reel substitution may include a wild reel substitution where all symbol positions for the reel are occupied by one or more wild symbols, and an extended wild reel substitution where an additional display position is added for the reel and all symbol positions for the reel are occupied by one or more wild symbols. The count limits may be different for one or more reels. The eligibility criterion for wild reel substitution may be set for each reel.

In yet other implementations, the method may include setting all of the m−1 reels including the special symbols.

For example, the m reels may be equal to 5, where reels 2 to 5 include the special symbols. In another example, n is a set number of games and the base game rounds is greater than the feature game rounds. An n set number of games may be fixed, e.g., where n=10. In one example, there are nine base game rounds (b=9) and one feature game round (f=1). In yet another implementation, a visual indicator of increasing opportunities to win may be displayed for each extended wild reel eligibility established.

In still other implementations, a game machine is disclosed. The game machine comprises a display; a credit input mechanism operable to establish credits on the gaming machine, the credit input mechanism including at least one of a coin input chute, a bill collector, a card reader and a ticket reader; meters configured for monitoring credits established via the credit input mechanism and changes to the established credits due to play of the gaming machine, the meters including a credit meter to which credit input via the credit input mechanism is added and a win meter; a random number generator; a game play mechanism including a plurality of buttons configured for operation by a player to input a wager from the established credits and to initiate a play of a game; and a game controller. The game controller comprises a processor and memory storing (i) instructions or game program code, and (ii) symbol data defining m reels, and wherein the game controller is operable to assign prize values to combinations of symbols as required during play of the game. The game controller may execute the instructions or game program code stored in the memory and responsive to initiation of the play of the game with the game play mechanism. The game controller executes n game rounds, wherein n=b+f game rounds, where b base game rounds are executed followed by f feature game rounds and in response to a wager placed to play the base game rounds, set a count limit for each reel bearing special symbols, the special symbols being borne by up to m−1 reels of a first set of reels. For each base game round, the game controller selects a plurality of symbols from a first set of reels using the random number generator, wherein at least one of the first set of reels includes one or more special symbols; and controls the display to display the selected symbols in a plurality of columns of display positions during play of a base game. For each occurrence of the special symbol within the displayed symbols and for the reel on which the special symbol appears, the game controller increments a counter up to the count limit for the reel, wherein the count persists for the base game rounds and evaluates the displayed symbols to determine any occurrence of winning symbol combinations and prize payable. For each feature game round, the game controller performs a wild reel substitution for each reel where the reel count satisfies an eligibility criterion to provide a second set of reels; selects a plurality of symbols from the second set of reels using the random number generator; controls the display to display the selected symbols in a plurality of columns of display positions; evaluates the displayed symbols to determine any occurrence of winning symbol combinations and prize payable; and makes an award of credits to the win meter or the credit meter based on a total of prize values assigned to combinations of symbols.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

It is to be understood that, if any prior art publication is referred to herein, such reference does not constitute an admission that the publication forms a part of the common general knowledge in the art, in Australia or any other country.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed is:

1. An electronic gaming device comprising:

a display; and a game controller having at least one processor and a memory storing (ii) symbol data defining a plurality of reels, and (ii) instructions, which, when executed, cause the at least one processor to at least:

initiate a number of game rounds including a combination of one or more base game rounds and one or more feature game rounds, wherein the one or more base game rounds are initiated followed by the one or more feature game rounds;

in response to a player input placed to play the one or more base game rounds, set a count limit for each reel including one or more special symbols, the one or more special symbols being than the plurality of reels of a first set of reels;

for each of the one or more base game rounds:

map a plurality of symbols from the first set of reels, based on one or more of a plurality of random numbers generated by a random number generator, wherein at least one of the first set of reels includes the one or more special symbols;

control the display to display the plurality of symbols mapped in a plurality of columns of display positions during play of a base game, and a number of paylines to evaluate the plurality of symbols selected;

for each occurrence of the special symbol within the plurality of symbols displayed on a reel, control the display to visually increment a counter up to the count limit for the reel, wherein the count persists for the base game rounds;

evaluate the plurality of symbols displayed to determine an occurrence of a winning symbol combination;

assign a prize value to the winning symbol combination;

for each of the one or more feature game rounds:

control the display to animate a wild reel substitution for each of the plurality of reels where a reel count satisfies an eligibility criterion to provide a second set of reels;

select a second plurality of symbols from the second set of reels, based on the one or more of the plurality of random numbers generated by the random number generator;

control the display to display the second plurality of symbols selected in the second set of reels, and the number of paylines being increased to a second number of paylines to evaluate the second plurality of symbols;

evaluate the second plurality of symbols displayed to determine any occurrence of winning symbol combinations based on the second number of paylines;

assign a second prize value to winning symbol combinations of symbols; and control the display to display an award of credits to a win meter or a credit meter based on a total of prize values assigned to combinations of symbols.

2. The electronic gaming device of claim 1, wherein the instructions, when executed, further cause the at least one processor to apply a multiplier where the reel count satisfies the eligibility criterion.

3. The electronic gaming device of claim 1, wherein the instructions, when executed for the wild reel substitution, further cause the at least one processor to substitute all symbol positions for a respective reel with one or more wild symbols.

4. The electronic gaming device of claim 3, wherein the instructions, when executed, further cause the at least one processor to display a visual indicator to animate the number of paylines being increased in each extended wild reel eligibility established.

5. The electronic gaming device of claim 1, wherein the count limit is different for one or more reels.

6. The electronic gaming device of claim 4, wherein the eligibility criterion for the wild reel substitution is set for each of the plurality of reels.

7. A method for controlling a gaming system that comprises a plurality of electronic gaming devices including a display, and a server, being coupled to the plurality of electronic gaming devices, the server comprises a game controller, a processor and a memory storing symbol data defining a set of symbols for each of a plurality of reels wherein for less than the plurality of reels, the set of symbols includes one or more special symbols, and instructions, which, when executed, cause the processor at least to initiate a game, the method comprising:

setting, in response to input of a wager, a count limit for each reel based on the wager;

initiating a plurality of game rounds, wherein the plurality of game rounds comprise one or more base game rounds and one or more feature game rounds that follow the base game rounds, for each of the one or more base game rounds:

mapping, by the game controller, a plurality of symbols from the set defining the plurality of reels based on one or more of a plurality of random numbers generated by a random number generator, to be evaluated based on a first number of paylines;

displaying on the display the plurality of symbols mapped in a set of symbol positions as a game outcome; and displaying on the display incrementing a counter with a special symbol count up to a limit for each occurrence of the special symbol on a reel, wherein the special symbol count persists for the one or more base game rounds;

for each feature game round:

displaying on the display a wild reel substitution for each of the plurality of reels where a reel count satisfies an eligibility criterion, and mapping, by the game controller, a second plurality of symbols for one or more non-wild substituted reels; and displaying on the display an award of credits based on winning combinations of symbols in the second plurality of symbols selected based on a second number of paylines for evaluation that is larger than the first number of paylines.

8. The method of claim 7, further comprising applying a multiplier where the special symbol count satisfies the eligibility criterion.

9. The method of claim 7, further comprising substituting all symbol positions for a respective reel with one or more wild symbols for the wild reel substitution.

10. The method of claim 9, wherein the limit for the special symbol count is different for one or more reels.

11. The method of claim 10, wherein the eligibility criterion for the wild reel substitution is set for each of the plurality of reels.

12. The method of claim 7, further comprising displaying a visual indicator, wherein the visual indicator shows increasing win opportunities, and modifying the visual indicator as each extended wild reel eligibility is established.

13. A non-transitory computer-readable medium comprising symbol data defining a set of symbols for a plurality of reels wherein for less the plurality of reels, the set of symbols includes one or more special symbols, and instructions for conducting a game on a gaming system having a plurality of electronic gaming devices, and a server, being coupled to the plurality of electronic gaming devices, the server comprising a game controller using a processor, and the instructions, which, when executed, cause the processor to perform the steps of:

in response to input of a wager, triggering a plurality of game rounds, wherein the plurality of game rounds comprise one or more base game rounds followed by one or more feature game rounds, using the set of symbols for each of the plurality of reels wherein for less than the plurality of reels, the set of symbols includes the one or more special symbols;

for each of the one or more base game rounds to be evaluated under a first number of paylines:

mapping a plurality of symbols from the set of symbols defining the plurality of reels for display in a set of symbol positions as a game outcome;

for each occurrence of the special symbol for a reel on which the special symbol appears, visually indicating on the display an increment of a counter with a special symbol count up to a count limit for the reel based on the wager, wherein the special symbol count persists for the one or more base game rounds;

for each feature game round:

displaying on the display a wild reel substitution for each reel where a reel count satisfies an eligibility criterion and an increase of the first number of paylines resulting a second number of paylines, mapping a second plurality of symbols for one or more non-wild substituted reels to a symbol position; and displaying an award of credits based on winning combinations of symbols in the second plurality of symbols evaluated based on the second number of paylines.

14. The non-transitory computer-readable medium of claim 13, further comprising applying a multiplier where the special symbol count satisfies the eligibility criterion.

15. The non-transitory computer-readable medium of claim 13, wherein all of the plurality of reels include the special symbols.

16. The non-transitory computer-readable medium of claim 15, wherein when the plurality of reels include five reels, only four of the five reels include the special symbols.

17. The non-transitory computer-readable medium of claim 13, wherein the plurality of game rounds comprise a set number of games, and the one or more base game rounds are greater than the one or more feature game rounds.

18. The non-transitory computer-readable medium of claim 17, wherein the plurality of game rounds is a fixed plurality of game rounds.

19. The non-transitory computer-readable medium of claim 18, wherein the fixed plurality of game rounds comprise ten game rounds.

20. The non-transitory computer-readable medium of claim 19, wherein the one or more base game rounds include nine base game rounds, and the one or more feature game rounds include one feature game round.

* * * * *